(12) United States Patent
Cox

(10) Patent No.: US 7,997,182 B1
(45) Date of Patent: Aug. 16, 2011

(54) PROTECTIVE HULL FOR VEHICLES

(75) Inventor: Timothy J. Cox, Charleston, SC (US)

(73) Assignee: Timothy J. Cox, Charleston, SC (US)

( * ) Notice: Subject to any disclaimer, the term of this patent is extended or adjusted under 35 U.S.C. 154(b) by 764 days.

(21) Appl. No.: 12/119,656

(22) Filed: May 13, 2008

Related U.S. Application Data

(60) Provisional application No. 60/962,454, filed on Aug. 16, 2007, provisional application No. 61/048,799, filed on Apr. 29, 2008.

(51) Int. Cl.
*F41H 5/013* (2006.01)
*B60J 11/00* (2006.01)

(52) U.S. Cl. .... 89/36.09; 89/36.08; 89/937; 296/187.07

(58) Field of Classification Search .............. 89/36.01, 89/36.02, 36.07, 36.08, 36.09; 280/770, 280/848; 296/187.07, 190.03, 204
See application file for complete search history.

(56) References Cited

U.S. PATENT DOCUMENTS

| | | | |
|---|---|---|---|
| 4,655,307 A * | 4/1987 | Lamoureux | 180/69.1 |
| 4,727,789 A * | 3/1988 | Katsanis et al. | 86/50 |
| 5,070,764 A * | 12/1991 | Shevach et al. | 89/36.17 |
| 5,533,781 A * | 7/1996 | Williams | 296/204 |
| 5,663,520 A * | 9/1997 | Ladika et al. | 296/187.07 |
| 5,803,533 A * | 9/1998 | Schulz et al. | 296/204 |
| 6,523,450 B1 * | 2/2003 | Schreiber | 89/36.11 |
| 7,255,034 B2 | 8/2007 | Strassgurtl | |
| 7,357,062 B2 | 4/2008 | Joynt | |
| 2002/0185893 A1 * | 12/2002 | Hashirayama et al. | 296/204 |
| 2007/0234896 A1 * | 10/2007 | Joynt | 89/36.09 |
| 2008/0034953 A1 * | 2/2008 | Barbe et al. | 89/36.01 |
| 2008/0066613 A1 | 3/2008 | Mills et al. | |
| 2010/0218667 A1 * | 9/2010 | Naroditsky et al. | 89/36.02 |
| 2011/0017054 A1 * | 1/2011 | Naroditsky et al. | 89/36.02 |
| 2011/0072960 A1 * | 3/2011 | Hallissy et al. | 89/36.02 |

FOREIGN PATENT DOCUMENTS

WO   2008-048703 A2   4/2008

* cited by examiner

*Primary Examiner* — Bret Hayes

(57) ABSTRACT

A protective hull for a vehicle has a plate that covers at least a substantial portion of the underside of the vehicle. A plurality of supports extends laterally from longitudinal members, and a plurality of supports extends laterally from another longitudinal member. A plurality of V-shaped supports is disposed between the lateral supports. The supports have a plurality of voids therein. The voids do not have corners that could encourage tearing of the supports. Cells that are protected from puncture contain fire suppressant and are disposed over the supports.

29 Claims, 6 Drawing Sheets

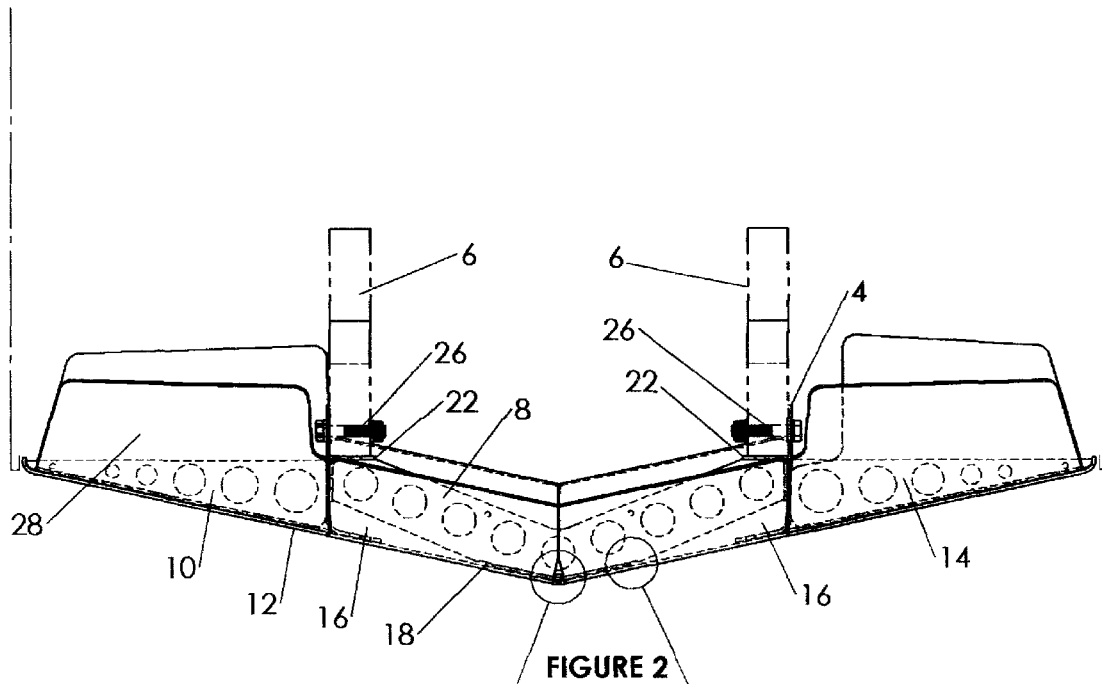
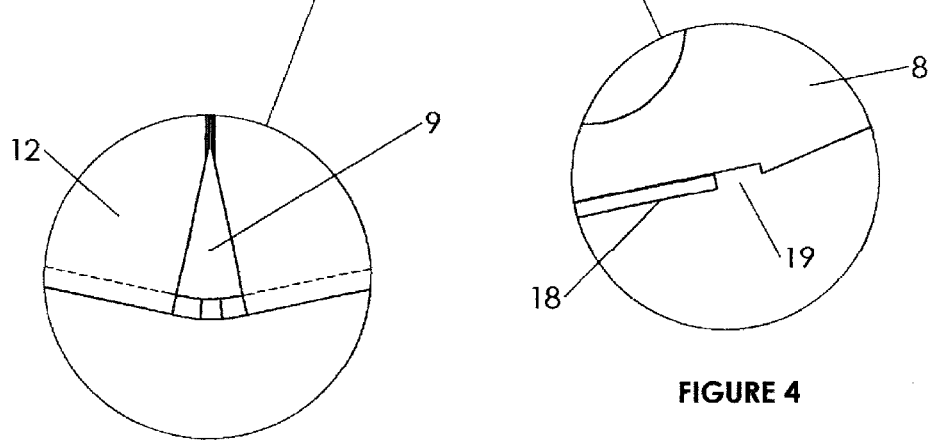
FIGURE 2
FIGURE 3
FIGURE 4

PROTECTIVE HULL FOR VEHICLES

RELATED APPLICATIONS

This application claims priority to, and the benefit of, provisional application Ser. No. 60/962,454 filed Aug. 16, 2007, and priority to, and the benefit of, provisional application Ser. No. 61/048,799 filed Apr. 29, 2008.

FIELD OF THE INVENTION

This invention relates to protective devices for vehicles.

BACKGROUND OF THE INVENTION

Vehicles operating in hazardous or dangerous conditions or circumstances may be subject to trauma from underneath the vehicle. Force may be rendered to the bottom of the vehicle from objects in the path of the vehicle that strike the underside of the vehicle. In the extreme, a vehicle may be subject to substantial force rendered by explosives. The source of the extreme force may be rendered by explosives such as bombs, or landmines that are intended to disable the vehicle as it traverses terrain.

There is a need for a device that will protect the underside of the vehicles from trauma or force. The device should assist in protecting the underside of the vehicle from objects that strike the underside of the vehicle, and also protect the vehicle from explosive blasts and similar forces.

SUMMARY OF THE INVENTION

The invention is a protective hull for a vehicle. A plate that covers at least a substantial portion of the underside of the vehicle. A plurality of supports extends laterally from longitudinal members, and a plurality of supports extends laterally from another longitudinal member. A plurality of V-shaped supports is disposed between the lateral supports. The supports have a plurality of voids therein. The voids do not have corners that could encourage tearing of the supports. Cells that are protected from puncture contain fire suppressant and are disposed over the supports.

BRIEF DESCRIPTION OF THE DRAWINGS

FIG. 2 is a front elevation of an embodiment of the protective hull for a vehicle, showing supports as a phantom.

FIG. 3 is an isolation taken from FIG. 2.

FIG. 4 is an isolation taken from FIG. 2.

DESCRIPTION OF THE PREFERRED EMBODIMENT(S)

Figure 1:
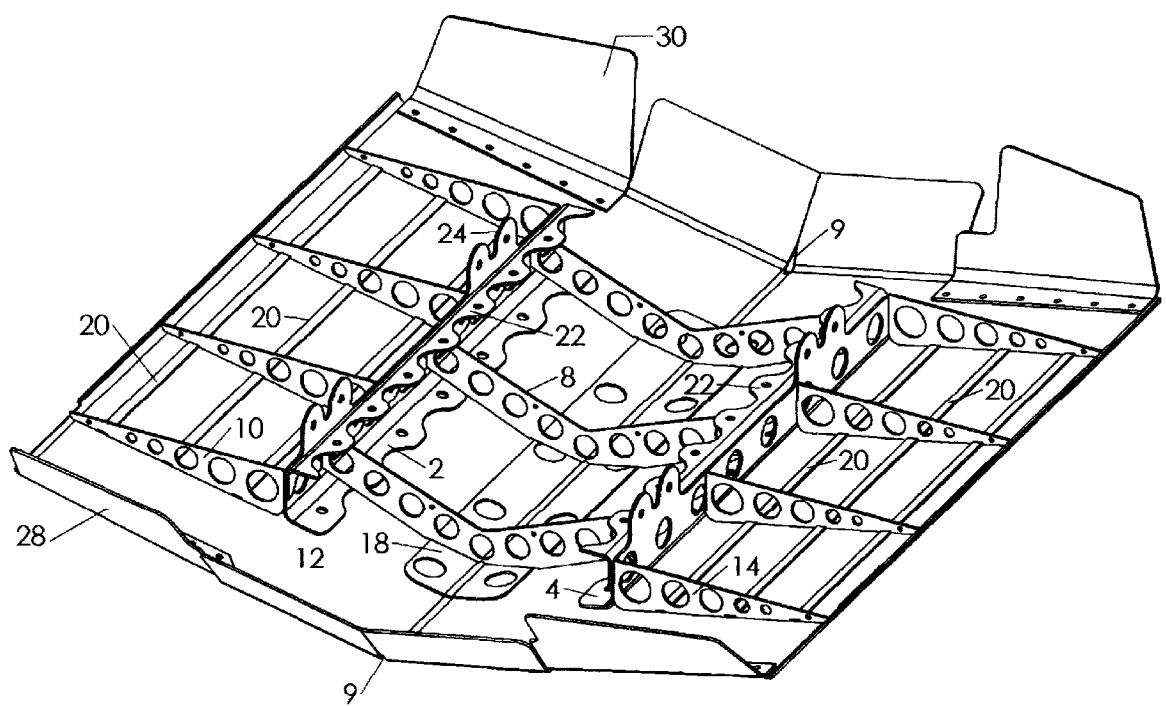
FIG. 1 is a perspective view of an embodiment of the protective hull for a vehicle.
Figure 5:
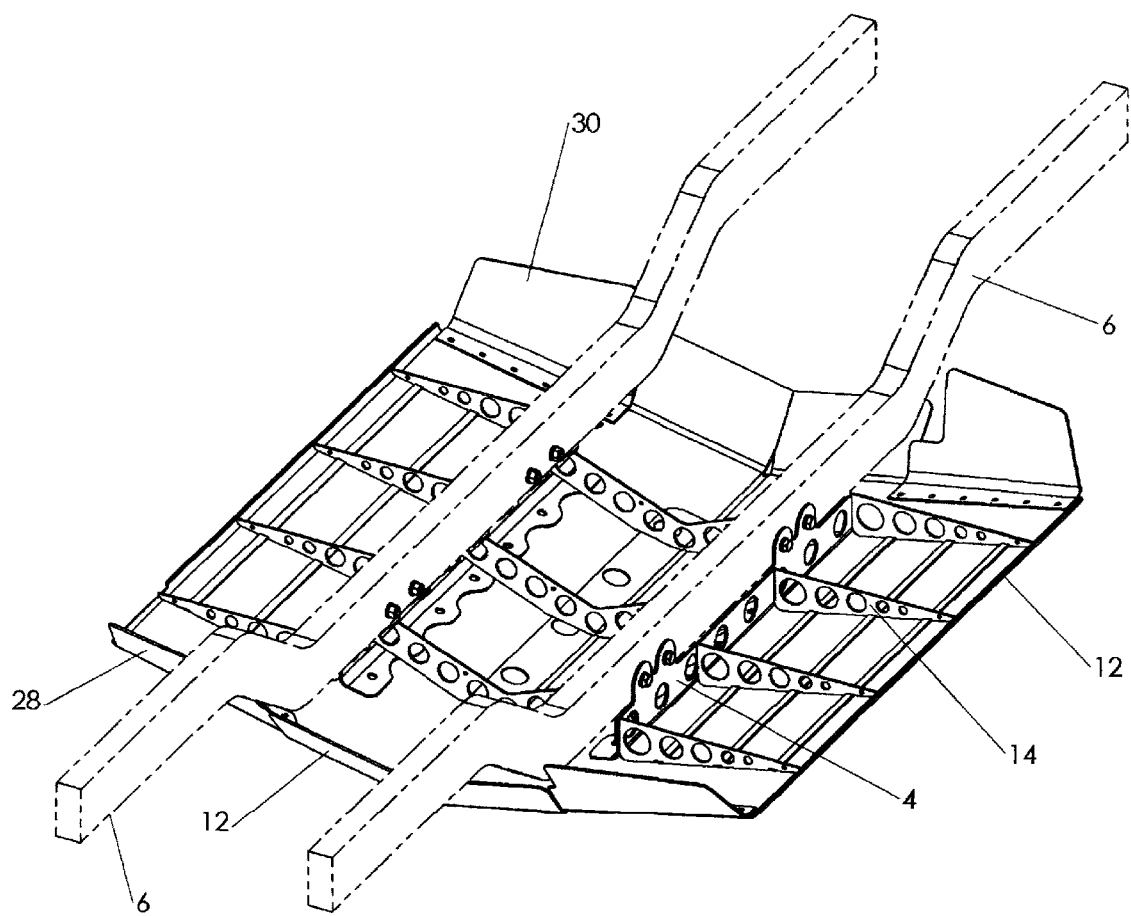
FIG. 5 is a perspective view of an embodiment of the protective hull for a vehicle, demonstrating the protective hull as mounted to a vehicle frame.

Turning now to the drawing figures, FIG. 1 shows the major elements of the protective hull for a vehicle according to an embodiment of the invention. As shown, the protective hull has upright supports, or members, that comprise a first longitudinal member 2 and a second longitudinal member 4. The longitudinal members are preferred to be generally parallel to each other. However, the longitudinal sides may be adapted to the geometry of the frame of the vehicle 6 to which the protective hull is to be mounted.

Disposed between the longitudinal first member and the second longitudinal member are a plurality of V-shaped support members 8. In a preferred embodiment, there are three V-shaped supports. It is preferred that at least three V-shaped supports are employed. However, additional supports or fewer supports, may be used depending upon the length of the vehicle to which the protective hull is to be mounted.

A plurality of supports 10 extends longitudinally from the upright supports and on a side opposite the V-shaped supports. The lateral supports extend generally from the first longitudinal member to a first outer edge of a plate 12.

A second plurality of supports 14 extends from the second longitudinal side, and opposite the V-shaped supports. The plurality of second supports extends generally from the longitudinal second side to the opposite side of the V-shaped hull from the plurality of first supports.

It is preferred that the V-shaped supports disposed between the first longitudinal side of the upright supports and the second longitudinal side of the upright supports are positioned so that they are between one of the first supports and another of the first supports, and one of the second supports, and another of the second supports when viewed from above. The V-shaped supports will be present on an opposite side of the respective longitudinal sides from the lateral supports, and the V-shaped supports will be disposed between the plurality of the first supports and the second supports. FIG. 1.

Plate 12 is disposed beneath the plurality of first supports, the plurality of second supports, and the plurality of V-shaped supports. As is particularly demonstrated by FIG. 2, the plate is preferred to be V-shaped. A bottom surface of the plurality of first supports and plurality of second supports may be angled at approximately the same angle as the V-shaped hull. The V-shaped supports have a different angle, so as to provide a space or void between the inner face of the V-shaped plate and the plate. The angle on the side of the V-shaped supports that is less than 180° is also an angle that is of fewer degrees than the angle of the plate that is less than 180°, so as to create space 16 between the V-shaped supports and the plate. As shown in FIG. 2, the distance between the V-shaped supports and the V-shaped plate increases as each end of the V-shaped support is approached. However, in a preferred embodiment, the lower side of the V-shaped support has an angle approximate to the center thereof that is substantially the same as the angle of the V-shaped plate.

In a preferred embodiment, a secondary plate 18 is disposed below the V-shaped support and between plate 12 and the V-shaped support. The secondary plate is present approximate to the center of the V-shaped support, and has an angle that is substantially the same as the angle of the plate. The secondary plate has a plurality of voids therein.

The significance of the space between the V-shaped support and the plate is to allow the plate to receive and absorb a force, such as a force from a blast, without immediately transmitting the force to the V-shaped support. The plate will crumple, thereby absorbing the force as it deforms from the blast, but will not initially transmit the force to the V-shaped support.

Each of the first supports, second supports and V-shaped supports, and the secondary plate according to the preferred embodiment has circular voids. Circular voids do not have sharp corners. Sharp corners are subject to tearing when a force, such as a force from a blast, is applied to the supports. The voids encourage the supports to deform without breaking, thereby absorbing energy from a blast. The voids are resistant to tearing from the blast. In this manner, deformation of the supports, as they absorb energy, is controlled. While it is desirable for the supports to deform to absorb energy, it is undesirable for the supports to tear or break. Accordingly, while the voids help the supports to absorb energy by allowing the supports to deform, the circular voids resist breaking, tearing, or severing of the supports. The supports of a preferred embodiment have circular voids therein, and, if other shapes for voids are employed, the shapes should not have sharp corners. All surfaces of the voids are preferred to be arcuate. By the term "all surfaces", it is meant all surfaces in the plane of the support as shown in FIG. 2, wherein the voids are shown as circular. It is possible that the forming process, from stamping or otherwise, could form corners at the cut in the supports that is not arcuate, but such corners are not included in the term "all surfaces" as used herein.

As shown in FIG. 3, a drain hole 9 may be present in the plate. The drain hole may be provided at the front and the rear of the plate.

As shown in FIG. 4, an expansion gap 19 is present between the secondary plate 18 and the V shaped support members 8. This gap is present on each side.

In a preferred embodiment, straps 20 are disposed between the first supports the second supports and the plate. The straps are preferred to be continuous from the front most of the plurality of first supports to the rear most plurality of first supports. In the embodiment that is shown, the straps are generally parallel to each other. Likewise, the plurality of straps are continuous from the front most of the plurality of second supports to the rear most of the plurality of second supports as shown in FIG. 1. The straps stretch upon receiving impact from a blast or other force. The straps help prevent tearing of the plate between the plurality of supports as the hull absorbs energy from a blast or other force.

A seat 22 extending over the top of each of the V-shaped supports is preferred. The seat may be used for mounting of the hull. The seat helps hold the V-shaped support in place, but also helps prevent shearing of bolts 26 that are used to mount the hull to the vehicle by means of the generally vertical mounting brackets 24.

In one embodiment, blast plates are mounted to the plate. Firewall blast plates 28 may be used on the front of the plate, and rear blast plates 30 may also be used on the rear of the plate. The firewall blast plates and the rear blast plates assist in keeping fire out of the space between the hull and the bottom of the vehicle, and also prevent energy and/or shrapnel from a blast from entering the space between the bottom of the vehicle and the plate.

In one embodiment, the plate is comprised of a deformable metal. The deformable metal absorbs energy from the blast, but resists tearing. It is preferred that the plate not tear, so that fire, or perhaps noxious or toxic substances, are kept out of the vehicle. In another embodiment, the plate is formed of a carbon component, such as carbon fiber, or a composite material, such as a laminate having at least one layer with a carbon composition.

The supports may comprise deformable metal. The supports may comprise a carbon component, such as carbon fiber, or a composite material, such as a laminate having at least one layer with a carbon composition.

FIGS. 6 through 10 show additional elements that may be added to the device of FIG. 1 to enhance the performance of the protective hull of the invention. The enhancements may be located above and on the inner face of the plate, and under the driver, co-driver and/or both passengers.

Figure 6:
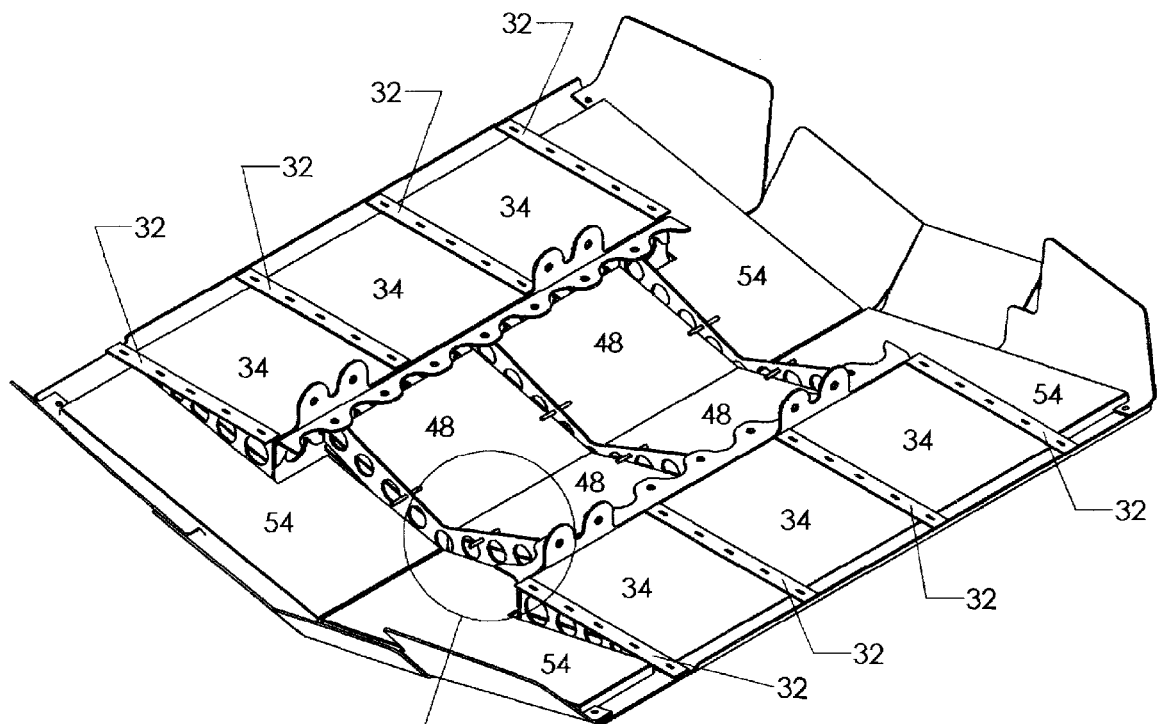
FIG. 6 is a protective hull showing for a vehicle shown in FIG. 1 having added protection elements.

FIG. 6 shows top cap bars 32 that are added to supports 14 of the hull of FIG. 1. An energy and projectile resistant material is disposed between the supports. The energy and projectile resistant material may be a panel 34. The panel may comprise an aramid fiber. The aramid fiber may be Kevlar or Twaron. The top cap bars assist in retaining the panels in place, and prevent curling of the outside edges of the plate in the event of force or impact to the plate.

A container is positioned in the hull. The container 36 may be a plastic box, which may be corrugated. The box may be formed of plastic that may be 0.2-0.4 cm thick. The box is preferred to house a cell 38. The cell should be gas impervious. The cell may comprise rubber. The cell is positioned inside the box and the box is enclosed. A cell, as that term is used herein, comprises the container and the cell. The cell is preferred to be filled with a flame retardant gas 42. The flame retardant gas may be Halon.

An access slot is formed in a side or flap of the box to allow a fill valve 40 for the cell and cell to be accessed. Attached to the fill valve is a one directional check valve. Quick disconnects and tubs may be connected with a fill valve at one end.

In one embodiment, there are three cells per side, with a total of six cells total per hull. The two sets of three cells may communicate for ease of filling with gas. The cells may communicate, but should be independent of each other through the use of valves, to prevent all of the cells in a set from discharging if only one cell is compromised.

A line may connect all of the cells on one side, or all of the cells, so as to provide a central filling location for multiple cells. Check valves at the fill valves 40 allow flow of the gas into, but not out of the cells, so that gas does not flow from the cells. The line may have one or more ports for filling the cells with gas. The port or ports may each have a check valve to prevent all of the cells in a set from discharging if only one cell, or the line, is compromised. The line may pass through voids in supports 10,14.

Positioned above the box may be a panel 46 that is approximately the same length and width as the box. The panel is formed of an impact and projectile resistant material. The panel may comprise aramid fiber. The aramid fiber may be Kevlar or Twaron.

A block of energy absorbing compressible material 44 may be attached, such as by glue to panel 46. The block of energy absorbing compressible material may be a wedged shaped piece of foam material. The foam material may be High Impact Polystyrene block of foam (HIPS) that has high fire resistance coefficient. On top of the foam block another panel may be affixed that is longer than the foam block.

The cells may be installed into the hull so that they are located between each of the supports. The plate as shown in this embodiment accommodates six cells. Flat bar 32 may be formed or attached to each of the tops of the upright supports. The flat bars hold the cells in place and retard the uprights from cutting into the floor pan of the vehicle.

A flame retardant gas such as Halon gas may be injected into each cell. After the Halon is injected, HIPS may be applied into remaining voids. This retards slippage or movement of the cells, and prevents water from collecting within the voids between the supports.

Figure 8:
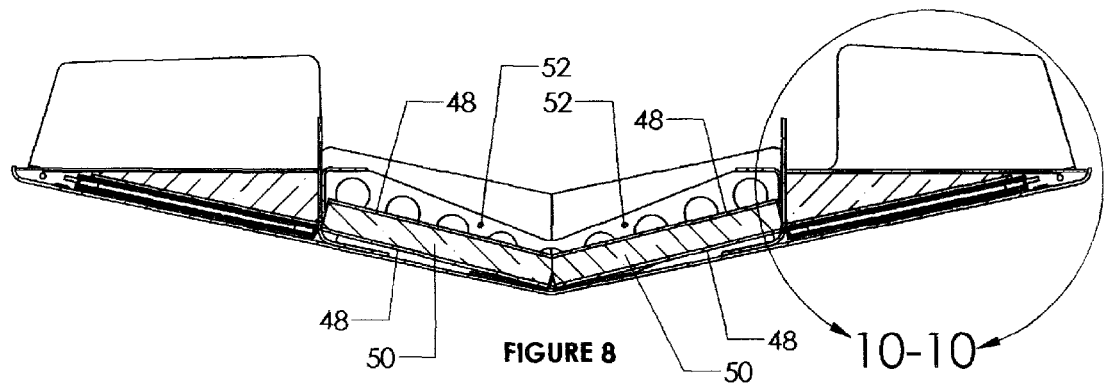
FIG. 8 is a sectioned view taken essentially along line 8-8 of FIG. 7.

Additional cells may be located within the center of the hull, between the first longitudinal member 2 and a second longitudinal member 4, generally under the housing for the vehicle's transmission and drive shaft. This housing is sometimes a referred to as a doghouse. The center cells may comprise impact and projectile resistant panels 48, which may be formed of materials like panels 46, and may comprise Kevlar or Twaron. The center cells may comprise an energy absorbing compressible material, and may comprise a block of HIPS 50. FIG. 8. This structure forms a sandwich style panel. Six center cells may be used in the embodiment shown. The cells may be wedged under the upright in which the frame of the vehicle is mounted to meet at the center of the hull. The center cells may be positioned at a steeper angel than the angle of the hull. After the center cells are in place, additional HIPS may be sprayed to fill in the voids. Additional holes 52 may be located in the center supports and may be located at about 2.5 cm from the top edge. A tub, which may comprise stainless steel and be about 10 cm. in length, may be pressed into the holes and lap over the top panel. The tub locks in the center cells. The stainless steel tube gives limited resistance to the cell.

Figure 9:
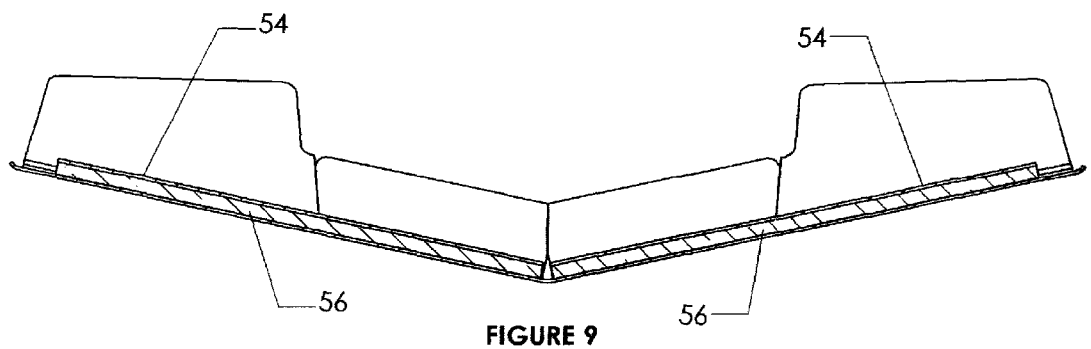
FIG. 9 is a sectioned view taken essentially along line 9-9 of FIG. 7.
Figure 10:
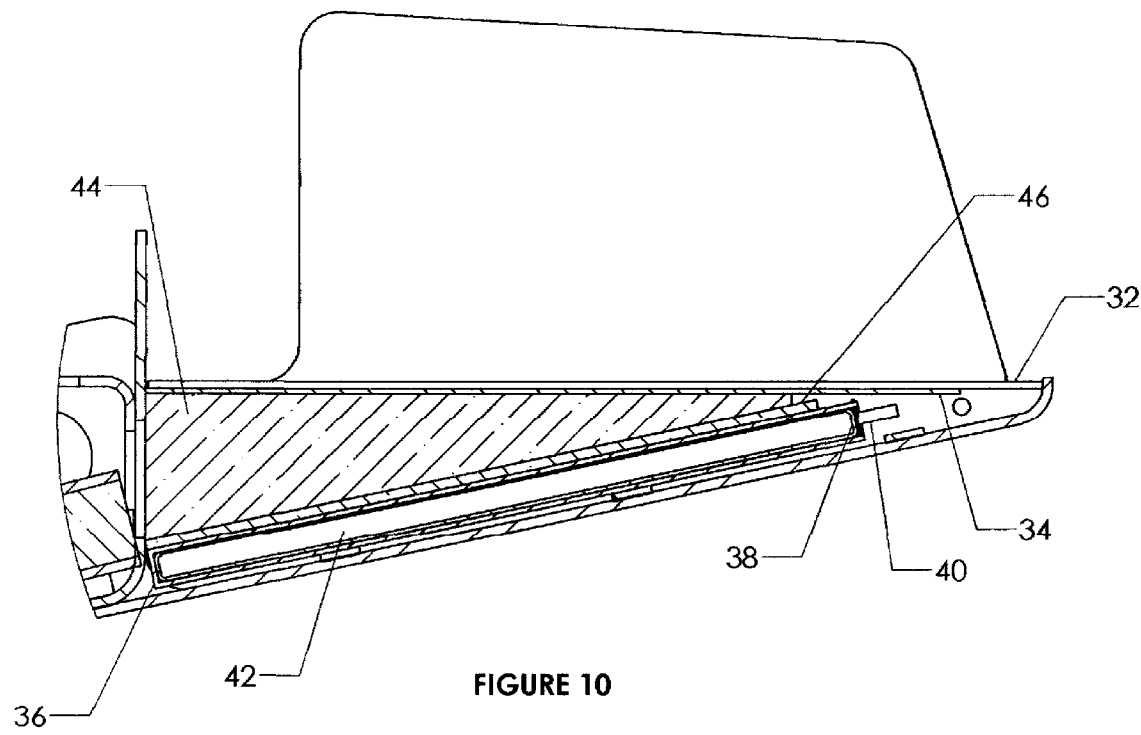
FIG. 10 is an isolation taken essentially along line 10-10 of FIG. 8.

A third type of cells may be located out side the upright supports on the internal face of the hull and wheel well plates. FIG. 9. Outside cells may comprise impact and projectile resistant panels 54, which may comprise Kevlar or Twaron, and a block of HIPS 56, cut to an accommodating shape to form an open-face sandwich style panel. The open-face panel may be installed with the foam side down and glued to the internal face of the hull and wheel well plates.

Figure 11:
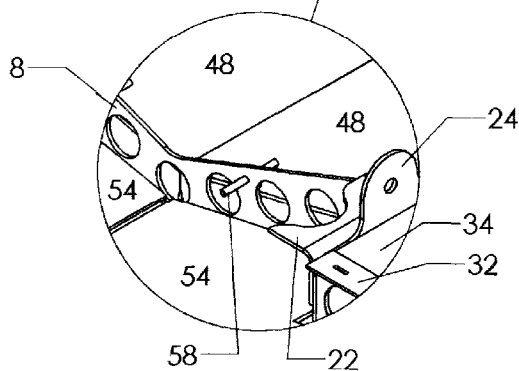
FIG. 11 is an isolation taken from FIG. 6.
Figure 7:
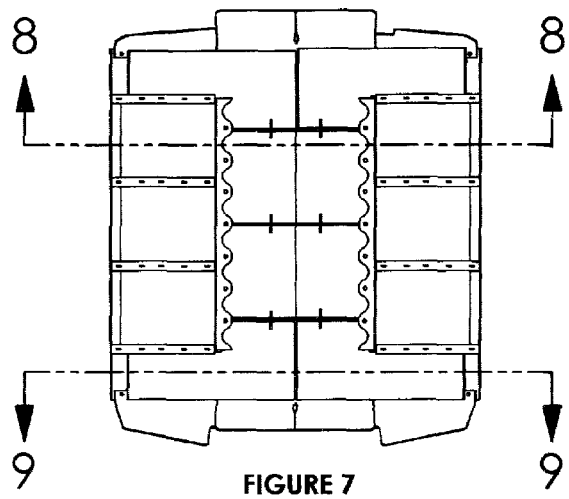
FIG. 7 is a top plan view of the protective hull for a vehicle shown in FIG. 6.

A stop 58 may be provided for the cells. FIG. 11. The stop may be may be a tube positioned in a void in the support.

In the embodiment as shown, the device may be retrofitted to a vehicle, such as a Hummer®. The mounting brackets are adapted to the specific vehicle, such as a Hummer®, so as to mount to the existing frame of the Hummer®, with little modification of the existing vehicle.

In use, the vehicle hull according the invention will absorb a substantial blast. The device is designed to deform upon receiving a blast, so as to absorb energy from the blast. As designed, the plate first absorbs a portion of the blast, and deforms. If the plate is unable to absorb all of the energy from the blast, the supports are designed to absorb additional energy from the blast. The plate should not tear or rip from the blast, since the plate is preferred to be adequately supported by the supports and the straps and to resist tearing. Likewise, the supports are designed to deform as energy is received by them, with voids therein that facilitate crumpling and energy absorption. The supports also resist breaking and reducing their effectiveness. In summary, the structure of the device is designed so as to crumple or deform so as to absorb energy from the blast or other trauma received from underneath the vehicle.

What is claimed is:

1. A protective hull for an underside of a vehicle, comprising:
    members that mount to a vehicle frame, said members comprising a longitudinal first side and a longitudinal second side;
    a plurality of first supports that extend laterally from said longitudinal first side, each of said plurality of first supports comprising a plurality of annular voids therein, wherein all surfaces of said annular voids are arcuate;
    a plurality of second supports that extend laterally from said longitudinal second side and opposite said plurality of first supports, each of said second supports comprising a plurality of annular voids therein, wherein all surfaces of said annular voids are arcuate;
    a plurality of v-shaped supports that are disposed between said longitudinal first side and said longitudinal second side, each of said v-shaped supports comprising a plurality of annular voids therein, wherein all surfaces of said annular voids are arcuate; and
    a plate that is disposed beneath said plurality of first supports, said plurality of second supports and said plurality of v-shaped supports, wherein an inner face of said plate is spaced apart from a bottom surface of a first end of each of said plurality of v-shaped supports and said inner face of said plate is spaced apart from a bottom surface of a second end of each of said v-shaped supports that is opposite said first end of each of said plurality of v-shaped supports.

2. A protective hull for an underside of a vehicle as described in claim 1, wherein each of said plurality of first supports are substantially parallel to each other, and each of said plurality of second supports are substantially parallel to each other.

3. A protective hull for an underside of a vehicle as described in claim 2, wherein said plurality of v-shaped supports are substantially parallel to each other.

4. A protective hull for an underside of a vehicle as described in claim 1, wherein said plurality of v-shaped supports are substantially parallel to each other.

5. A protective hull for an underside of a vehicle as described in claim 1, wherein said plate is formed as a unitary member.

6. A protective hull for an underside of a vehicle as described in claim 1, wherein a first plurality of longitudinal straps is disposed between said plate and said plurality of first supports and a second plurality of longitudinal straps is disposed between said plate and said plurality of second supports.

7. A protective hull for an underside of a vehicle as described in claim 6, wherein each of said first plurality of straps is generally parallel to each other and each of said second plurality of straps is generally parallel to each other.

8. A protective hull for an underside of a vehicle as described in claim 1, wherein said longitudinal first side and said longitudinal second side are substantially parallel to each other.

9. A protective hull for an underside of a vehicle as described in claim 1, wherein said plurality of first supports comprises at least three annular voids, and wherein said second plurality of annular voids comprises at lest three annular voids.

10. A protective hull for an underside of a vehicle as described in claim 1, wherein said plurality of first supports comprises at least five annular voids, and wherein said second plurality of annular voids comprises at least five annular voids.

11. A protective hull for an underside of a vehicle as described in claim 1, wherein said plurality of v-shaped supports comprise at least three annular voids.

12. A protective hull for an underside of a vehicle as described in claim 1, wherein said plurality of v-shaped supports comprise at least five annular voids.

13. A protective hull for an underside of a vehicle as described in claim 1, further comprising a generally vertical mounting bracket extending from each of said longitudinal first side and a longitudinal second side.

14. A protective hull for an underside of a vehicle as described in claim 1, wherein one of said plurality of v-shaped supports is disposed opposite and between one of said plurality of first supports and another of said plurality of first supports, and said one of said plurality of v-shaped support is disposed opposite and between one of said plurality of second supports and another of said plurality of second supports.

15. A protective hull for an underside of a vehicle as described in claim 1, wherein a lower surface of said plate is v-shaped.

16. A protective hull for an underside of a vehicle as described in claim 15, wherein a v-shaped angle of said plurality of v-shaped supports that is less than 180 degrees is of a sharper angle than a v-shaped angle of said v-shaped plate that is less than 180 degrees.

17. A protective hull for an underside of a vehicle as described in claim 1, wherein a mounting plate for a v-shaped support extends over a top of a first end of said v-shaped support and a second mounting plate extends over a top of a second end of said v-shaped support.

18. A protective hull for an underside of a vehicle as described in claim 1, further comprising a secondary plate that is disposed between a "v" of said plurality of v-shaped supports and said plate.

19. A protective hull for an underside of a vehicle as described in claim 18, wherein said secondary plate comprises a plurality of annular voids therein, wherein all surfaces of said annular voids are arcuate.

20. A protective hull for an underside of a vehicle as described in claim 1, wherein said annular voids are circular.

21. A protective hull for an underside of a vehicle as described in claim 1, further comprising a cell, wherein said cell is disposed above said plate, and wherein said cell is disposed above said plate and between one of said plurality of first supports and another of said plurality of first supports, and wherein said cell contains a fire suppressant gas therein.

22. A protective hull for an underside of a vehicle as described in claim 1, further comprising a panel that is disposed above said plate, wherein said panel is disposed above said plate and between one of said plurality of first supports and another of said plurality of first supports, wherein said panel comprises puncture resistant aramid fiber.

23. A protective hull for an underside of a vehicle as described in claim 1, further comprising energy absorbing compressible material that is disposed above said plate wherein said energy absorbing compressible material is disposed above said plate and between one of said plurality of first lateral supports and another of said plurality of first supports.

24. A protective hull for an underside of a vehicle as described in claim 1, further comprising a cell, wherein said cell is disposed above said plate and between one of said plurality of first supports and another of said plurality of first supports, and wherein said cell contains a fire suppressant gas therein, and further comprising a panel that is disposed above said plate and above said cell, wherein said panel comprises puncture resistant aramid fiber, and further comprising energy absorbing compressible material that is disposed above said cell.

25. A protective hull for an underside of a vehicle as described in claim 24, further comprising a panel that is disposed above said plate and above said cell and above said energy absorbing compressible material, wherein said panel comprises puncture resistant aramid fiber.

26. A protective hull for an underside of a vehicle as described in claim 24, wherein said compressible material comprises polystyrene.

27. A protective hull for an underside of a vehicle as described in claim 1, further comprising a plurality of cells, wherein said plurality of cells each contain a fire suppressant gas therein, and further comprising panels disposed above said plate and above said plurality of cells, wherein said panels comprise puncture resistant aramid fiber, and further comprising energy absorbing compressible material that is disposed above said cells, wherein one cell of said plurality of cells is positioned under a location of a driver of the vehicle, and another cell of said plurality of cells is positioned under a passenger of the vehicle.

28. A protective hull for an underside of a vehicle as described in claim 27, further comprising a panel that is disposed above said plate and above said cell and above said energy absorbing compressible material, wherein said panel comprises puncture resistant aramid fiber.

29. A protective hull for an underside of a vehicle as described in claim 27, wherein said compressible material comprises polystyrene.

* * * * *